March 1, 1938.   A. L. PARKER   2,109,801
VALVE MECHANISM
Filed May 25, 1936
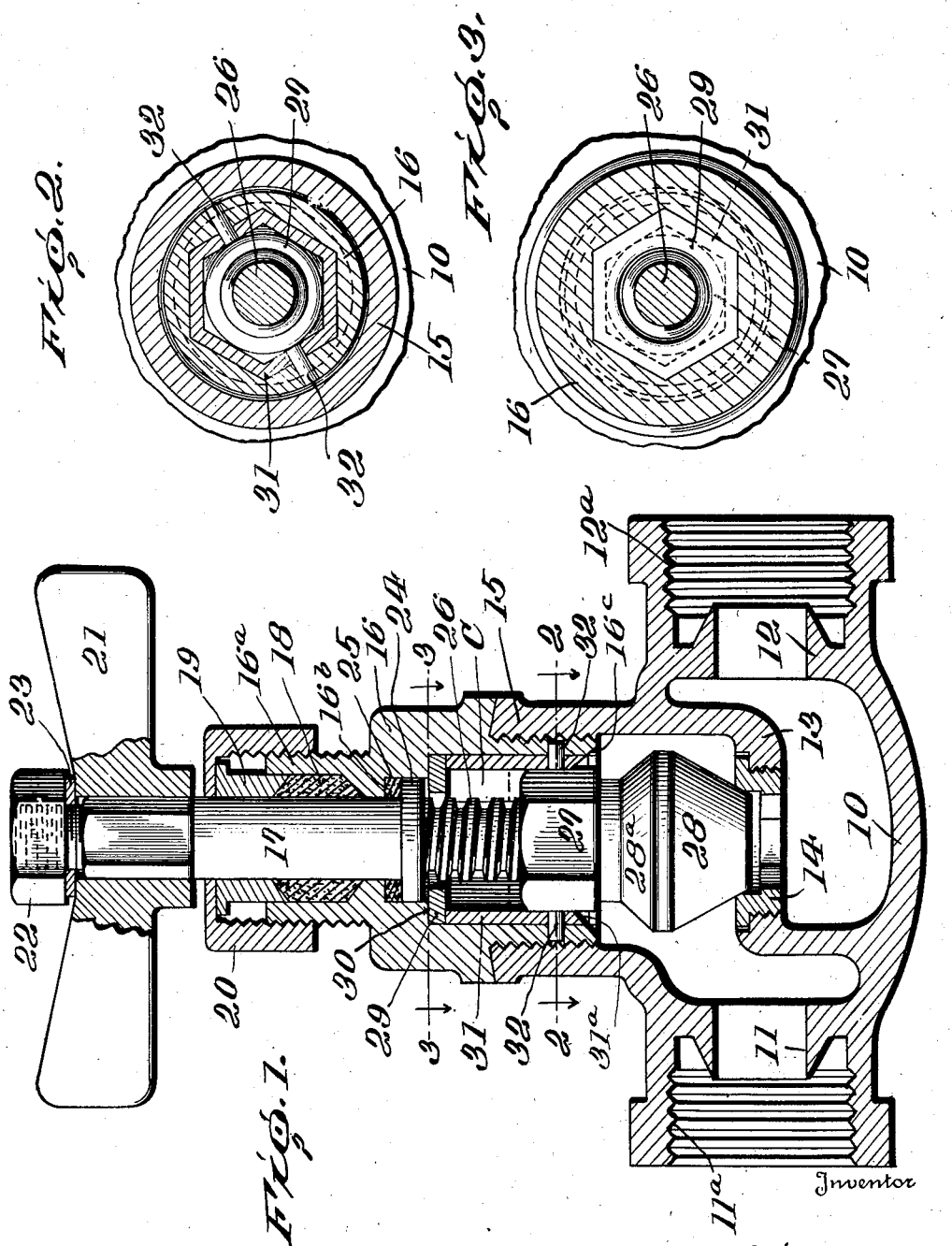
Inventor
Arthur L. Parker
By Mason + Porter
Attorneys

UNITED STATES PATENT OFFICE 2,109,801

VALVE MECHANISM

Arthur L. Parker, Cleveland, Ohio

Application May 25, 1936, Serial No. 81,775

2 Claims. (Cl. 251—48)

The present invention relates to new and useful improvements in a valve mechanism and more particularly to improvements in a globe type valve mechanism which has a non-rising, rotatable operating stem.

An object of the invention is to provide a valve mechanism of the above type wherein the frictional resistance normally encountered in the turning of the operating stem is greatly reduced.

A further object of the invention is to provide a valve mechanism of the above type wherein means are disposed within the bonnet chamber for preventing rotation of the valve and for preventing endwise movement of the operating stem.

The above and other objects of the invention will in part be obvious and will be hereinafter more fully pointed out.

In the accompanying drawing:

Figure 1 is a side view, in section, showing the valve mechanism;

Fig. 2 is a sectional view taken along the line 2—2 of Fig. 1; and

Fig. 3 is a sectional view taken along the line 3—3 of Fig. 1.

The invention relates generally to a valve mechanism of the globe type which includes a casing having a valve seat disposed therein, a valve for controlling the passage through the casing and an operating stem for controlling the valve. The operating stem and the valve are threadedly engaged with one another and a non-circular sleeve is inserted within the bonnet chamber to prevent rotation of the valve. This sleeve also holds in place within the bonnet chamber a washer which cooperates with a shoulder on the operating stem to prevent or limit the endwise movement thereof. Thus, the operating stem is of the non-rising type, but is rotatable to effect movement of the valve toward and away from the valve seat through the threaded connection between the stem and the valve.

Referring more in detail to the accompanying drawing, the valve casing 10 is provided with inlet and outlet ports 11, 12, and the usual threaded extensions 11a, 12a, which are adapted to be connected to suitable conduits. The casing is also provided with a partition wall 13 having a threaded opening therethrough. A valve seat 14 is threaded in the opening through the partition wall 13. The casing 10 is provided with an internally threaded extension 15 above the valve seat 14. A bonnet 16 is secured to the extension 15 or the casing and is provided with a central chamber C above the valve seat. The walls of the bonnet chamber form a non-circular periphery and, in the present embodiment of the invention, are illustrated as forming a hexagonal chamber.

A valve operating stem 17 extends through the bonnet 16 and into the bonnet chamber C. The bonnet 16 is provided with an externally threaded extension 16a within which is a packing recess surrounding the operating stem 17. A packing 18 is compressed in this recess by a follower 19 which is held and compressed by a packing nut 20 threadedly engaging the extension 16a on the bonnet 16. The stem 17 is provided with an operating handle 21 which is held by a nut 22 and a lock washer 23. Within the bonnet 16, the stem 17 is provided with an annular shoulder 24. A packing washer 25 is disposed between the shoulder 24 and an inwardly extending portion 16b on the bonnet 16. The stem 17 is threaded, as at 26, below the shoulder 24 and this threaded portion engages the non-circular portion 27 of the valve 28.

A metal washer 29 is fitted within the bonnet 16 and is disposed against an offset portion 30 at the upper end of the chamber C. The washer 29 underlies the shoulder 24 on the operating stem 17 and serves to prevent downward movement of the stem. A hexagonal sleeve 31 is pressed within the bonnet chamber and against the washer 29 so as to hold the washer in position. The sleeve 31 is held within the bonnet chamber by pins 32 which extend therethrough and into the bonnet wall. The portion 27 of the valve 28 is also hexagonal in shape so as to closely fit within the sleeve 31.

It will be seen, therefore, that the operating stem 17 is of the non-rising type and that the rotation thereof will cause the valve, through the threaded engagement therewith, to move toward or away from the valve seat 14, thus controlling the passage through the valve casing 10. The valve 28 is restrained against rotation by the hexagonal shaping of the portion 27 thereof which closely fits within the hexagonal sleeve 31. The valve is, of course, free to slide longitudinally within the sleeve 31 as the operating stem 17 is rotated. The sleeve 31, in addition to preventing rotation of the valve 28, also serves to maintain the washer 29 in position. As pointed out above, the washer 29 and the packing washer 25 cooperate with the interposed shoulder 24 on the stem 17 to prevent endwise movement thereof.

The lower edge of the bonnet 16 is chamfered, as at 16c and the lower edge of the sleeve 31 is also chamfered to provide a tapered seat for the similarly tapered portion 28a of the valve 28.

Thus, when the valve 28 is removed from the seat 14, and moved upwardly, the portion 28a thereof will contact with the tapered seat formed by the chamfered portions 16c and 31a so as to form a tight seal. This will prevent the passage of fluid into the chamber C so that the packing nut 19 may be removed and the packing 18 changed, thus making it possible to repack the valve under pressure.

According to the present invention, the packing 18 can be compressed by the follower 19 and packing nut 20 for high pressure service independently of the operating stem. In other words, there is no direct connection between the valve operating stem and the follower 19 or packing nut 20, so that the stem can be turned with a minimum of resistance without disturbing the set position of the packing. While the sleeve 31 and washer 29 have been illustrated as being independent units, it is to be understood that an integral structure may be provided.

It is to be clearly understood that minor changes in the details of construction and arrangement of parts may be made without departing from the scope of the invention, as set forth in the appended claims.

Having thus described the invention, what I claim as new and desire to secure by Letters-Patent, is—

1. A valve mechanism comprising a casing having a valve seat therein, a bonnet secured to said casing and having a non-circular chamber disposed above said valve seat, a valve operating stem extending through said bonnet and having a threaded end within said chamber, an annular shoulder on said stem disposed within the bonnet and operating to prevent outward endwise movement of the stem, a washer disposed within the chamber in said bonnet and immediately underlying said shoulder whereby to prevent inward endwise movement of the stem, a sleeve held within said chamber and conforming to the shape thereof, said sleeve abutting against said washer to hold the washer in place, and a valve cooperating with said valve seat and having a non-circular portion conforming to the internal shape of said sleeve and extending into the sleeve whereby to prevent rotation of the valve, said valve having threaded engagement with the end of said stem and being free to move endwise in said sleeve.

2. A valve mechanism comprising a casing having a valve seat therein, a bonnet secured to said casing and having a non-circular chamber disposed above said valve seat, a valve operating stem extending through said bonnet and having a threaded end within said chamber, an annular shoulder on said stem disposed within the bonnet and operating to prevent outward endwise movement of the stem, a washer disposed within the chamber in said bonnet and immediately underlying said shoulder whereby to prevent inward endwise movement of the stem, a sleeve fitted within said chamber and conforming to the shape thereof, said sleeve abutting against said washer to hold the washer in place, pins extending into said sleeve and said bonnet for holding the sleeve in place, and a valve cooperating with said valve seat and having a non-circular portion conforming to the internal shape of said sleeve and extending into the sleeve whereby to prevent rotation of the valve, said valve having threaded engagement with the end of said stem and being free to move endwise in said sleeve.

ARTHUR L. PARKER.